United States Patent [19]
Sundholm

[11] Patent Number: 5,575,338
[45] Date of Patent: Nov. 19, 1996

[54] VALVE FOR FIRE FIGHTING INSTALLATION

[76] Inventor: Göran Sundholm, Ilmari Kiannon kuja 3, FIN-04310 Tuusula, Finland

[21] Appl. No.: 307,828

[22] PCT Filed: Jan. 31, 1994

[86] PCT No.: PCT/FI94/00045

§ 371 Date: Dec. 30, 1994

§ 102(e) Date: Dec. 30, 1994

[87] PCT Pub. No.: WO94/16772

PCT Pub. Date: Aug. 4, 1994

[30] Foreign Application Priority Data

Jan. 29, 1993 [FI] Finland ..................................... 930416

[51] Int. Cl.$^6$ ............................. A62C 35/66; A62C 35/68
[52] U.S. Cl. ..................... 169/5; 169/9; 169/22; 137/113; 137/509
[58] Field of Search ............................. 169/5, 9, 19, 20, 169/21, 22, 60; 239/572; 137/113, 509

[56] References Cited

FOREIGN PATENT DOCUMENTS

| 0010465 | 4/1980 | European Pat. Off. |
| WO93/10860 | 6/1993 | WIPO . |

*Primary Examiner*—Andrew C. Pike
*Attorney, Agent, or Firm*—Ladas & Parry

[57] ABSTRACT

A valve for a fire fighting installation has an inlet into a valve body for connection to a primary source of a first liquid under a first pressure, a liquid space in the valve body for connection to a secondary source of a second liquid under a second pressure, an outlet from the valve body for connection to an out-going line for the first and second liquids, and a connection from the inlet to the outlet and a movable spindle in the valve body for closing the connection with one end of the spindle when the spindle is in a stand-by position and opening the connection when the spindle is in an activated position. An opposite end of the spindle is in the liquid space for the second pressure of the second liquid to urge the spindle toward the stand-by position, the spindle having a shoulder for pressing by the first pressure of the first liquid to urge the spindle toward the activated position, the relative areas of the shoulder and opposite end of the spindle being such that the first pressure can be higher than the second pressure for the second pressure still to urge the spindle sufficiently to hold the spindle in the stand-by position against the urging of the first pressure. A channel extends through the spindle from the one end to the opposite end of the spindle for supplying the second liquid to the outlet even when the connection is closed.

21 Claims, 5 Drawing Sheets

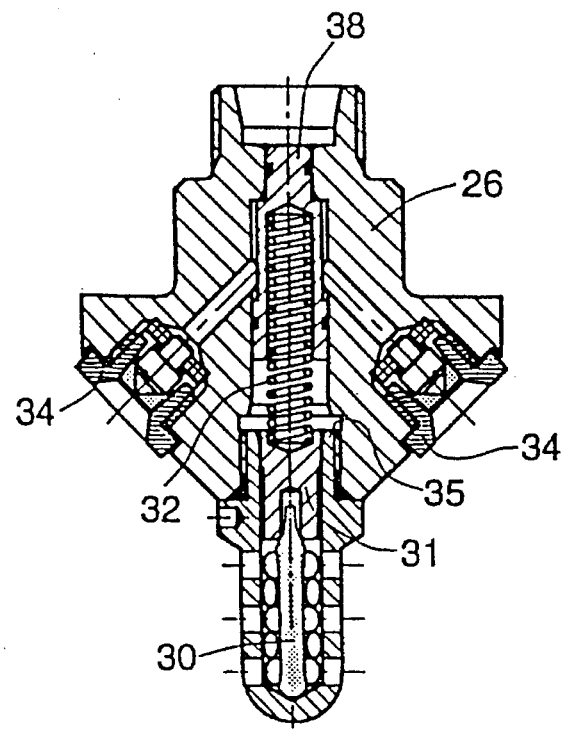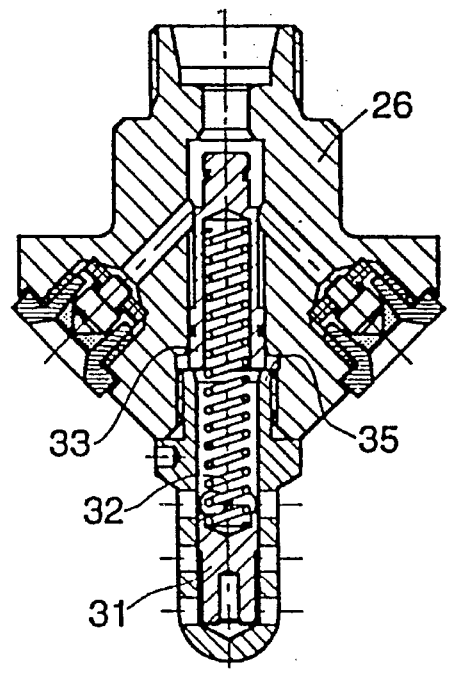
Fig. 4        Fig. 5
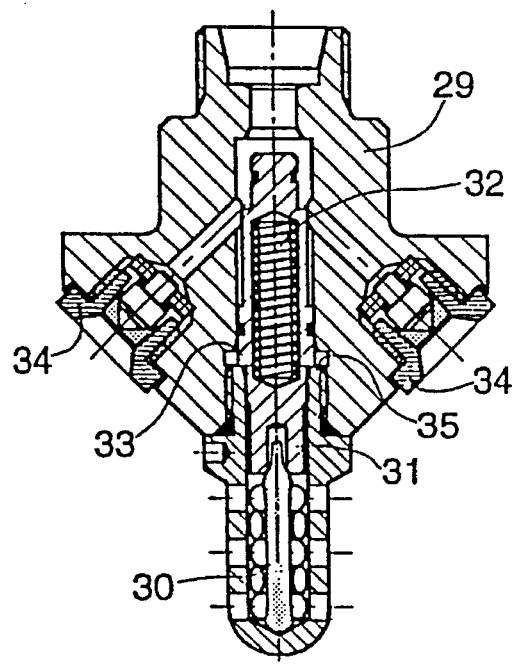
Fig. 6

VALVE FOR FIRE FIGHTING INSTALLATION

The present invention relates to a valve for a fire fighting installation and, in particular, for a fire fighting installation that is capable of operating with a high drive pressure for the extinguishing liquid. A high pressure in this context means a pressure within the range of from about 30 bar to about 300 bar, which contrasts with conventional low pressure installations, which have operating pressures of about 5–10 bar. The source for such high-pressure extinguishing liquid preferably is at least one hydraulic accumulator on an out-going line to a number of automatically releasable spray heads.

Known high pressure valves are expensive and, in most cases, electrically operated, which is a drawback in fire situations.

The object of the invention is to provide a new valve which is reliable without access to electric current and which is of a simple structure and, thus, cheap.

The valve according to the invention has an inlet connectable to a high pressure liquid source, an outlet connectable to an out-going line, and a spindle which is movable in one direction between a stand-by position in which the spindle closes a connection from the inlet to the outlet and an activated position in which the spindle opens the connection from the inlet to the outlet. The spindle has an axial through channel which connects the outlet of the valve to a liquid space which is under the influence of a secondary liquid source with a lower pressure than the high pressure source, whereby the pressure of the secondary liquid source acts on the spindle in a direction opposite to the one direction that opens the connection from the inlet to the outlet. The valve spindle also has a shoulder face under the influence of the pressure of the high pressure source in the one direction which is opposite to the pressure action of the liquid space on the spindle. The pressure of the secondary liquid source and the size of the shoulder face are mutually adapted in such a way that, when the secondary liquid source acts with its full pressure on the spindle via said liquid space, the spindle is held in the stand-by position but, when the pressure of the secondary liquid source has decreased to a predeterminable value due to liquid delivery to a released spray head, the pressure of the high pressure source on the shoulder face drives the spindle to the activated position.

A nonreturn valve is preferably positioned in the axial channel of the valve spindle. In the activated start of the valve, it prevents the pressure of the high pressure source from entering the liquid space. A spring also can be positioned in the liquid space to act on the valve spindle with such a force that the spindle is pressed toward the stand-by position after the high pressure source has been discharged to, e.g., 20 bar.

It is in many cases desirable to first release one spray head directly by a fire and then release a whole group of usually nearby spray heads. The invention also relates to a spray head for this purpose. The spray head comprises a spindle element pressed into the inlet of the spray head with such a spring force that the spindle element keeps the inlet closed against the pressure of the secondary liquid source, but yields to the pressure of the high pressure liquid source.

The invention is described below with reference to exemplifying preferred embodiment also shown in the attached drawing.

FIG. 4 is a cross-sectional elevation of a first preferred embodiment of a spray head included in the installation in the stand-by state.

FIG. 5 is a cross-sectional elevation of the first preferred embodiment of the spray head in an individually released state.

FIG. 6 is a cross-sectional elevation of the first preferred embodiment of the spray head in a group released state.

Figure 1:
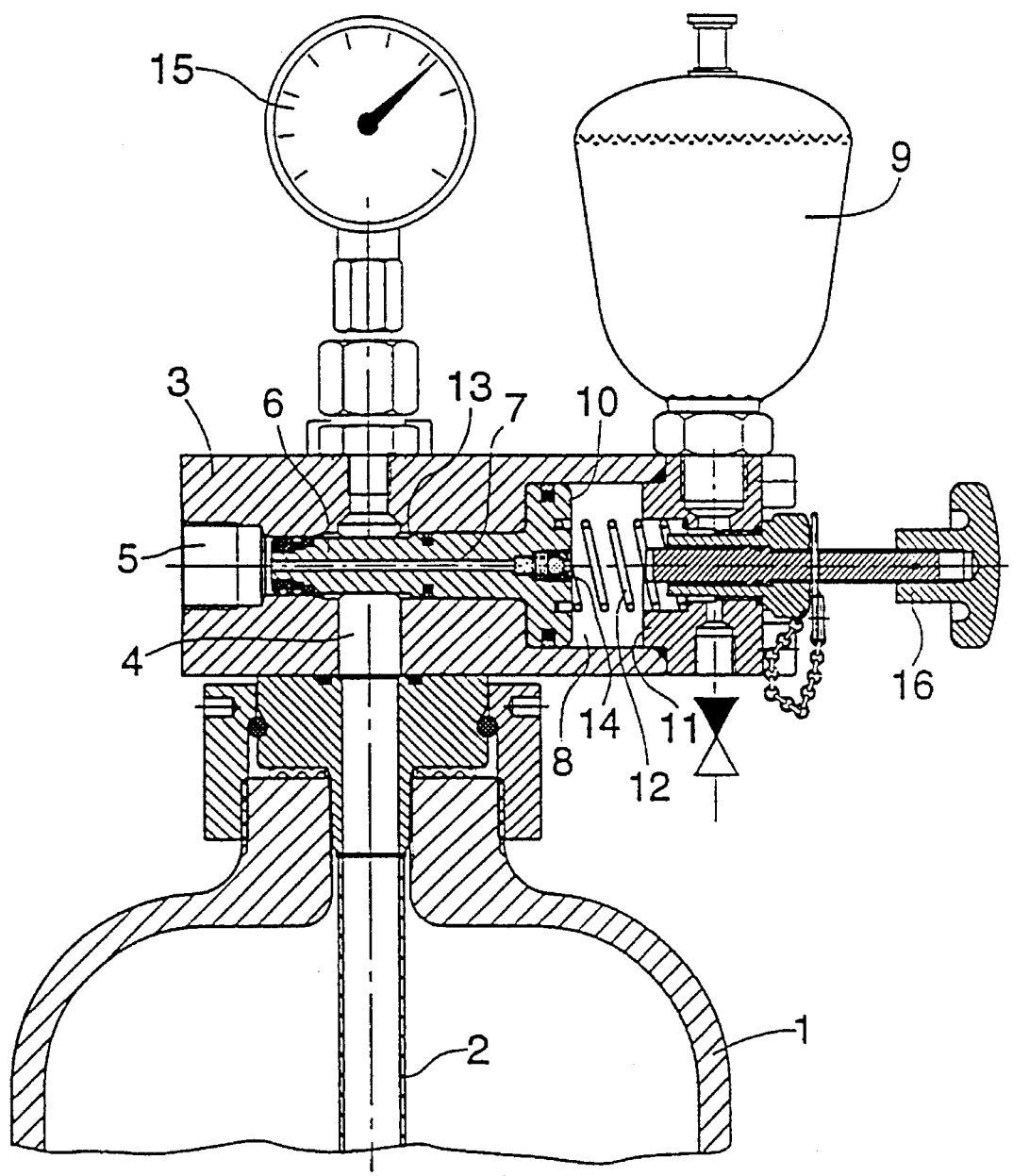
FIG. 1 is an elevational view, partly in cross section, of a valve in a stand-by state.
Figure 2:
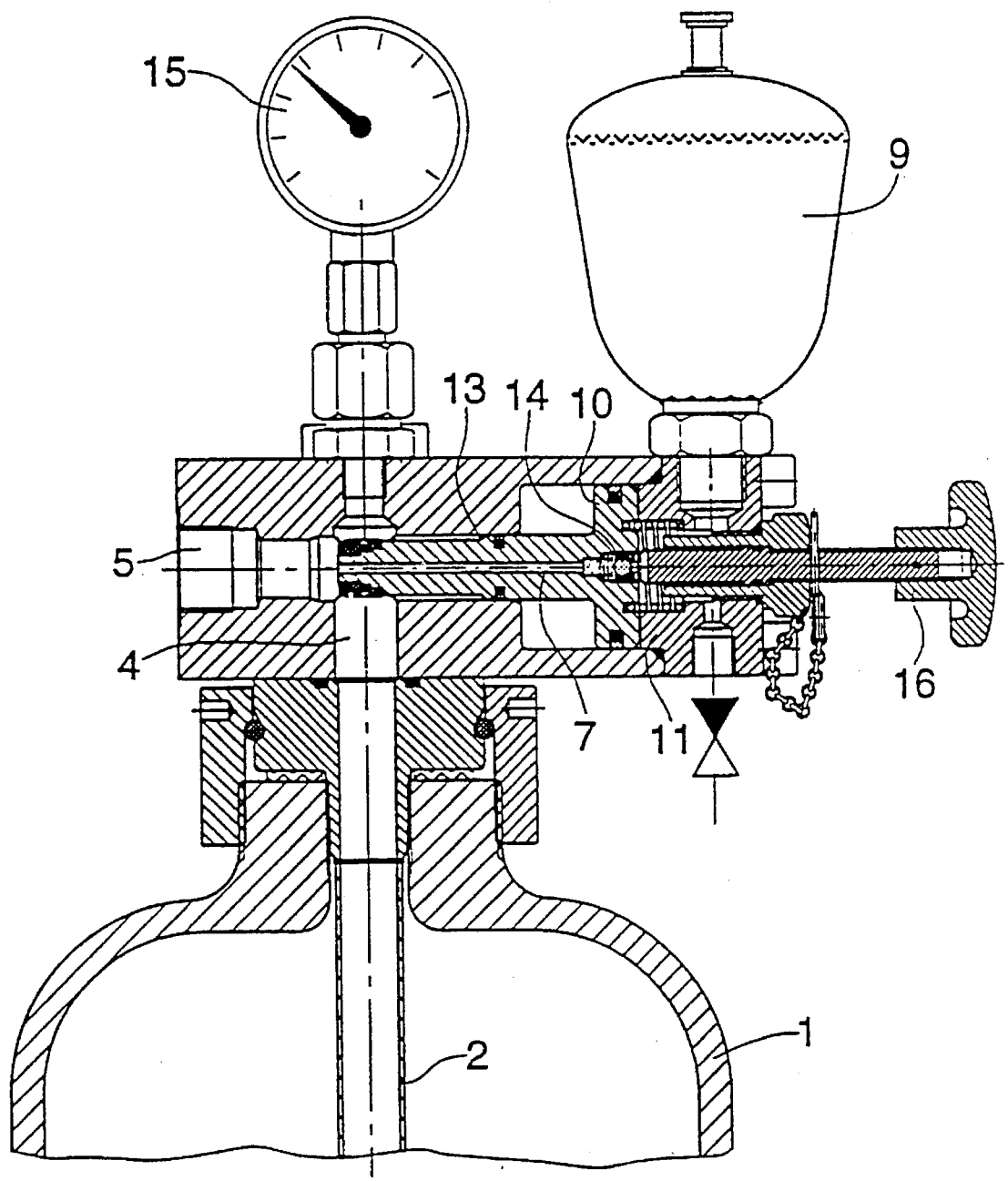
FIG. 2 is an elevational view, partly in cross section, of the valve in an activated state.

In FIGS. 1 and 2, a hydraulic accumulator 1 with a high charge pressure (e.g., 200 bar), which in the following is called the primary accumulator, has an outlet tube 2, which preferably is provided with a number of apertures in its wall according to the description in Finnish patent application 924752 to deliver a liquid and a mixture of the liquid and a drive gas of the accumulator. An inlet 4 of an outlet valve 3 is connected to an outlet end of the tube 2.

Figure 3:
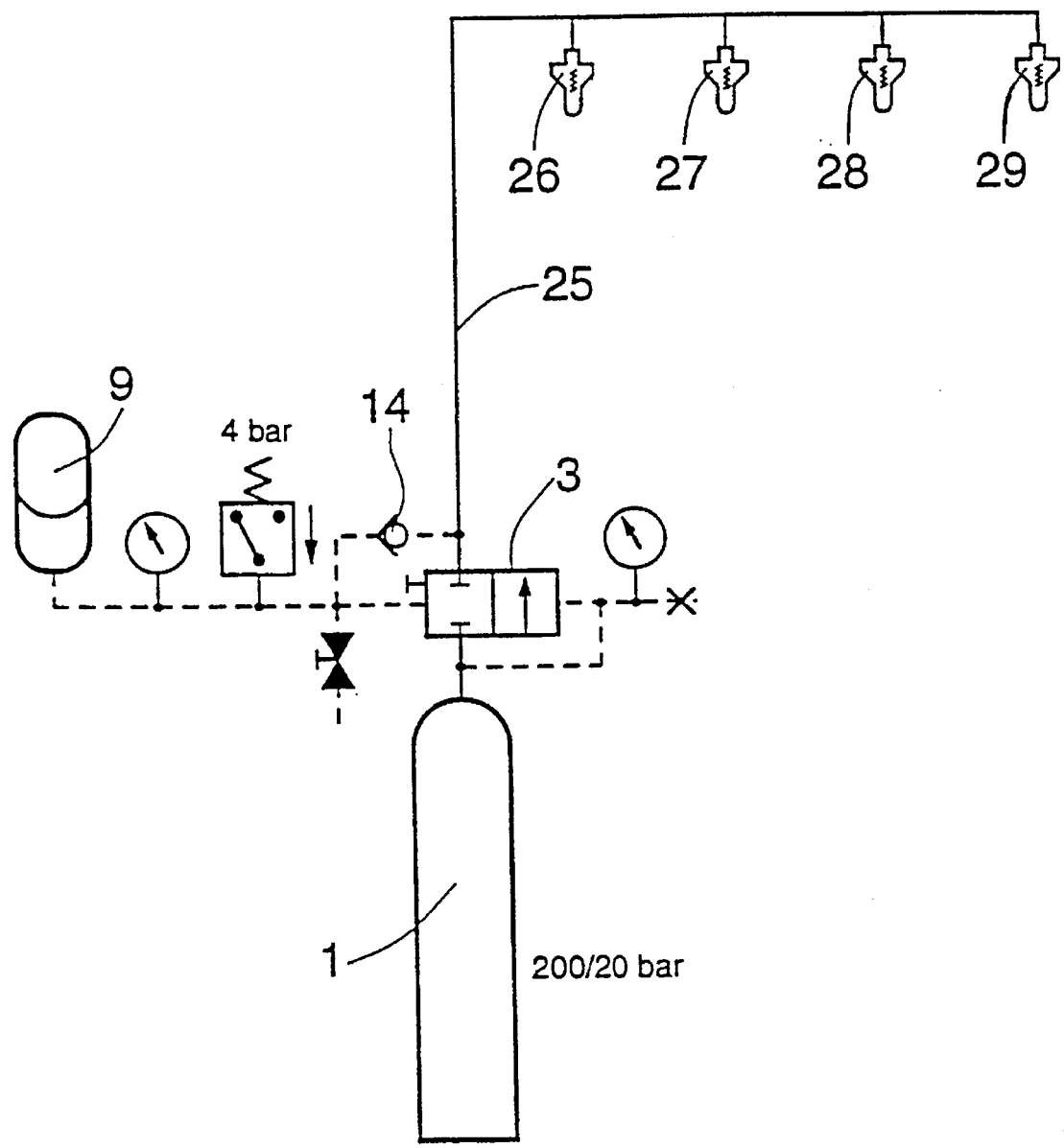
FIG. 3 is a coupling diagram of a fire fighting installation with the valve of FIG. 1 and spray heads in stand-by states.

An outlet 5 of the valve 3 is connected to an out-going line 25 (FIG. 3), which is connected to a number of automatically releasable spray heads 26–29 (FIG. 3).

In the stand-by position of the valve 3 according to FIG. 1, a connection between the inlet 4 and the outlet 5 of the valve is closed by a valve spindle 6. The valve spindle 6 has an axial through channel 7, which connects the outlet 5 to a liquid space 8 in the valve 3. The liquid space 8 is, in turn, connected to a small (e.g., about 0.3 liter) hydraulic accumulator 9 with a low charge pressure (e.g., 6–10 bar), the small hydraulic accumulator being called in the following the secondary accumulator.

The valve spindle 6 has a head 10, which is movable like a piston in one direction in the liquid space 8 between the position shown in FIG. 1, in which the head 10 presses against one end of the valve housing surrounding the liquid space 8 of the valve 3 and the spindle closes the outlet 5, and the position shown in FIG. 2, in which the head 10 presses against a shoulder 11 at an opposite end of the valve housing surrounding the head 10 and the spindle 6 opens the connection from the inlet 4 to the outlet 5 of the valve.

The spindle 6 is kept in the position shown in FIG. 1 by pressure of the liquid from the secondary accumulator in the liquid space 8, which acts on the spindle head 10, and by a spring 12, which presses on the spindle head 10 from the opposite end of the valve housing. However, pressure in the inlet 5 from the secondary accumulator 9 through the channel 7 on an end of the spindle therein and pressure from the primary accumulator on a ring shoulder 13 of the spindle 6 act in the one direction.

When one of the spray heads 26 to 29 (FIG. 3) that are connected to the outlet 5 is released, the secondary accumulator 9 starts delivering liquid to that spray head. As a result, the pressure from the secondary accumulator in the liquid space 8 falls quickly, the pressure of the primary accumulator 1 on the shoulder 13 becomes the greater and the spindle starts moving to the right as shown in FIG. 1. When that end of the spindle 6 that was in the outlet 5 reaches the inlet 4, the end comes under the influence of the pressure of the primary accumulator and the spindle 6 is driven to the position shown in FIG. 2 with its head against the shoulder or stop 11. However, the force of the spring 12 is preferably such that it will drive the spindle 6 back from the position of FIG. 2 to the position of FIG. 1 after the primary accumulator is discharged. A nonreturn valve 14 in the channel 7 of the valve spindle 6 prevents the pressure of the primary accumulator from entering the liquid space 8 as the valve spindle moves to the position of FIG. 2.

However, the force of the spring 12 is preferably such that it will drive the spindle 6 back from the position of FIG. 2 to the position of FIG. 1 after the primary accumulator is discharged.

A manometer 15 is indicated in FIGS. 1 and 2 as connected through the valve to the primary accumulator.

A manually operable reserver release 16 is shown as turned off so it does not effect the functions described above.

It is often advantageous when a fire breaks out to activate a group of the spray heads 27 to 29 (FIG. 3) while they still have their release ampoules intact. One preferable embodiment for the spray heads 26 to 29 of FIG. 3 for this purpose is shown in FIGS. 4–6 by, for example, the spray head 26 in FIGS. 4 and 5 and spray head 29 in FIG. 6.

This embodiment of spray head as a conventional release ampoule 30, which engages one end of a first spindle element 31, the opposite end of which is pressed by one end of a spring 32. The opposite end of the spring presses a second spindle element 33 against the inlet opening of the spray head. The force of the spring 32 is such that, without crushing the ampoule 30, it keeps the second spindle element 33 in the inlet of the spray head, as shown in FIG. 4, against the full pressure of the secondary accumulator 9, i.e., when the valve 3 on the primary accumulator 1 is in the state according to FIG. 1. As a result, the second spindle element 33 keeps the connection to the nozzles 34 of the spray head closed.

In FIG. 5, the ampoule 30 of the spray head 26 has been crushed or melted under the influence of a fire nearby. The spring 32 then pushed down the first spindle element 31 and the pressure from the secondary accumulator 9 was then able to push the second spindle element down to a stop 35 of the housing of the spray head. The connection from the inlet of the spray head 26 to its nozzles 34 is then open.

As a result, as earlier described, the valve 3 on the primary hydraulic accumulator 1 will take the state according to FIG. 2, and the pressure of the primary accumulator will act on the inlet of spray head 26 as well as the inlets to the spray heads 27, 28, and 29 (FIG. 3).

As is seen in FIG. 6, the pressure from the primary accumulator on the spindle element 33 of the spray head 29 (and any other of the spray heads 27 or 28 that still has its ampoule intact) will be pressed against the stop 35 and the connection from the inlet of the spray head 29 to its nozzles 34 opened. The force of the spring 32 is preferably such that even when compressed according to FIG. 6, it still does not crush the release ampoule 30; the pressure for opening the connection from the inlet to the nozzles 34 can be set, for example, to 15 bar in the line 35 (FIG. 3).

Figure 7:
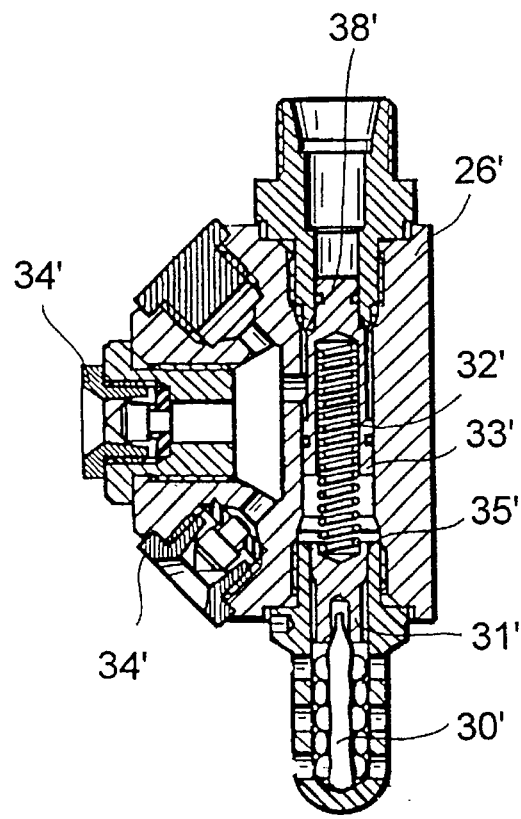
FIGS. 7–9 are cross-sectional elevations corresponding to FIGS. 4–6 but of a second preferred embodiment of a spray head.
Figure 8:
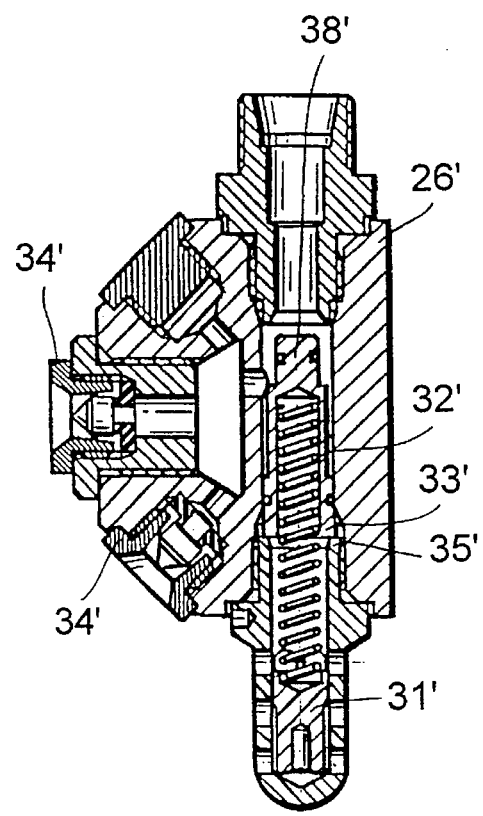
Figure 9:
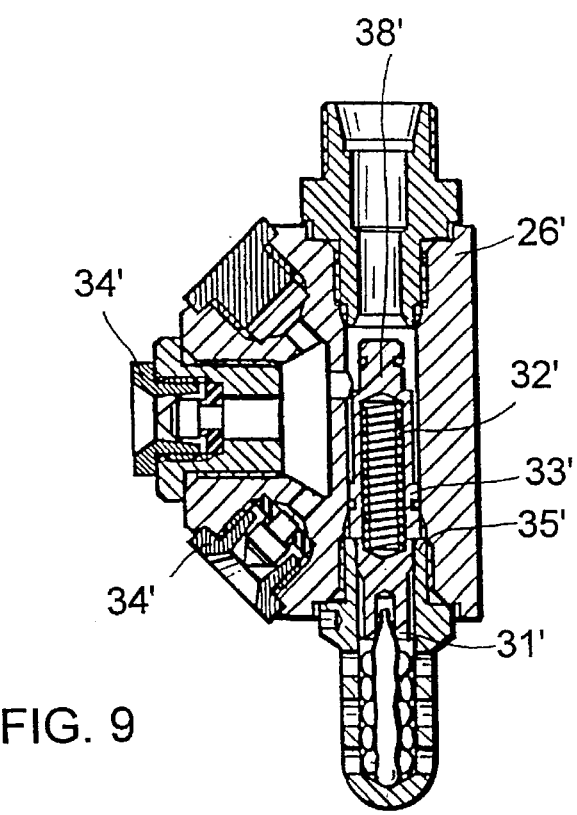

FIGS. 7–9 show an alternative embodiment which can be mounted on a wall and which works according to the same principle as described in the foregoing with reference to FIGS. 4–6. Corresponding but primed reference characters have been used for corresponding parts, therefore, and further description is unnecessary.

The spray heads according FIGS. 4–9 can of course be used independently of valves according to FIGS. 1 and 2, which valves on their part do not presuppose spray heads according to FIGS. 4–9.

For larger installations the invention can of course be applied on an arbitrary number of hydraulic accumulators and/or high pressure pumps. With respect to spray heads, nozzles, group release, and other arrangements, in each case can at will be applied what has been described, e.g., in the International Patent Applications PCT/FI92/00060, . . . /00122, . . . /00155, . . . /00156, . . . 00193, . . . /00213, . . . /00316, . . . /00317, and . . . /00330, which are publications WO92/15370, . . . /19324, . . . /20453, . . . /20454, . . . 22353, WO93/00962, . . . /10860, . . . /10859 and . . . /10861, respectively.

I claim:

1. A valve for fire fighting installation, the installation comprising a high pressure source of extinguishing liquid and a number of automatically releasable spray heads, whereby the high pressure source is adapted to deliver to the spray heads the extinguishing liquid of the high pressure source, the valve comprising an inlet (4) connectable to the high pressure source (1), an outlet (5) connectable to an out-going line, and a valve spindle (6) which is movable between a stand-by position in which the spindle closes a connection from the inlet to the outlet and an activated position in which the spindle opens the connection from the inlet to the outlet;

wherein the valve spindle (6) comprises an axial through channel (7) which connects the outlet to a liquid space (8) which is under influence of a secondary liquid source (9) with a lower pressure than a pressure of the high pressure source (1), the valve spindle (6) has a shoulder face (13) under the influence of the pressure of the high pressure source (1) in an opposite direction in relation to action of the lower pressure of the secondary liquid source in the liquid space (8) on the spindle (6), and the action of the lower pressure of the secondary liquid source (9) in the liquid space (8) on the spindle holds the spindle (6) in the stand-by position and the influence of the pressure of the high pressure source (1) on the shoulder face (13) drives the spindle (6) to the activated position when the lower pressure of the secondary liquid source (9) decreases to a predetermined value due to liquid delivery to at least one released one of the automatically releasable spray heads.

2. The valve according to claim 1, further comprising a nonreturn valve (14) in the axial channel (7) of the valve spindle (6) to prevent the pressure of the high pressure source from entering the liquid space (8) when the valve spindle (6) is in the activated position.

3. The valve according to claim 1, further comprising a spring (12) in the liquid space (8) acting in cooperation with the pressure of the secondary liquid source (9) on the valve spindle (6).

4. The valve according to claim 1, wherein the secondary liquid source is a hydraulic accumulator (9).

5. The valve according to claim 1, wherein said shoulder face is a ring shoulder (13).

6. A combination of a valve and spray heads, the valve comprising an inlet (4) connectable to a high pressure source (1) of extinguishing liquid, an outlet (5), and a valve spindle (6) which is movable between a stand-by position in which the spindle closes a connection from the inlet to the outlet and an activated position in which the spindle opens the connection from the inlet to the outlet, wherein the valve spindle (6) comprises an axial through channel (7) which connects the outlet to a liquid space (8) which is under influence of a secondary liquid source (9) with a lower pressure than a pressure of the high pressure source (1), the valve spindle (6) has a shoulder face (13) under influence of the pressure of the high pressure source (1)

in an opposite direction in relation to action of the lower pressure of the secondary liquid source in the liquid space (8) on the spindle (6), and the action of the lower pressure of the secondary liquid source (9) in the liquid space (8) on the spindle holds the spindle (6) in the stand-by position and the influence of the pressure of the high pressure source (1) on the shoulder face (13) drives the spindle (6) to the activated position when the lower pressure of the secondary liquid source (9) decreases to a predetermined value due to liquid delivery to one of the spray heads that has been released, and each of the spray heads comprising an inlet opening connected to the outlet (5), a nozzle (34), a release ampoule (30) a spring (32), and a second spindle element (33) pressed against the inlet opening by the release ampoule (30) and the spring (32), the spring (32) having such a spring force that the second spindle element (33) keeps the inlet opening closed against the lower pressure of the secondary liquid source (9) but yields to the pressure of the high pressure source (1) for releasing the extinguishing liquid from the nozzle (34) while the release ampoule (30) remains intact.

7. A combination of a valve and spray heads, the valve comprising an inlet (4) connectable to a high pressure source (1) of extinguishing liquid, an outlet (5), and a valve spindle (6) which is movable between a stand-by position in which the spindle closes a connection from the inlet to the outlet and an activated position in which the spindle opens the connection from the inlet to the outlet, wherein the valve spindle (6) comprises an axial through channel (7) which connects the outlet to a liquid space (8) which is under influence of a secondary liquid source (9) with a lower pressure than a pressure of the high pressure source (1), the valve spindle (6) has a shoulder face (13) under influence of the pressure of the high pressure source (1) in an opposite direction in relation to action of the lower pressure of the secondary liquid source in the liquid space (8) on the spindle (6), and the action of the lower pressure of the secondary liquid source (9) in the liquid space (8) on the spindle holds the spindle (6) in the stand-by position and the influence of the pressure of the high pressure source (1) on the shoulder face (13) drives the spindle (6) to the activated position when the lower pressure of the secondary liquid source (9) decreases to a predetermined value due to liquid delivery to one of the spray heads that has been released, and each of the spray heads comprising an inlet opening connected to the outlet (5), a nozzle (34), a release ampoule (30), a spring (32), a second spindle element pressed against the inlet opening by the release ampoule (30) and the spring (32), the spring (32) having such a spring force that the second spindle element keeps the inlet opening closed against the lower pressure of the secondary liquid source (9) but yields to the pressure of the high pressure liquid source for (1) releasing the extinguishing liquid from the nozzle (34) while the release ampoule (30) remains intact, and a fixed stop (35), wherein the second spindle element comprises a first spindle element portion (31) and a second spindle element portion (33), the release ampoule (30) being engaged by the first spindle element portion (31) which is pressed upon by a first end of the spring (32), a second end of the spring (32) pressing the second spindle element portion (33) against the inlet opening, the second spindle element portion (33) being arranged to move inwardly under the influence of the pressure of the high pressure source (1) to the fixed stop (35).

8. The combination according to claim 7, wherein the force of the spring (32) is such that the release ampoule (30) is not crushed when the second spindle element portion (33) moves to the fixed stop (35), whereby the spring (32) is in a compressed state.

9. A valve for a fire fighting installation, the valve comprising:

an inlet into a valve body for connection to a primary source of a first liquid under a first pressure;

a liquid space in the valve body for connection to a secondary source of a second liquid under a second pressure;

an outlet from the valve body for connection to an out-going line for the first and second liquids;

a connection from the inlet to the outlet and a movable spindle in the valve body for closing the connection with one end of the spindle when the spindle is in a stand-by position and opening the connection when the spindle is in an activated position, an opposite end of the spindle being in the liquid space for the second pressure of the second liquid to urge the spindle toward the stand-by position, the spindle having a shoulder for pressing by the first pressure of the first liquid to urge the spindle toward the activated position, relative areas of the shoulder and the opposite end of the spindle being such that the first pressure can be higher than the second pressure for the second pressure still to urge the spindle sufficiently to hold the spindle in the stand-by position against the urging of the first pressure; and a channel through the spindle from the one end to the opposite end of the spindle for supplying the second liquid to the outlet even when the connection is closed, whereby, when fire-caused release of a spray head on the out-going line drains sufficient of the second liquid for the second pressure to fall, the first pressure urges the spindle sufficiently to move the spindle to the activated position for opening the connection and supplying the first liquid through the connection and the outlet to the out-going line.

10. The valve according to claim 9, and further comprising a nonreturn valve in the channel to prevent liquid flow through the channel into the liquid space.

11. The valve according to claim 10, and further comprising a spring in the liquid space and acting on the opposite end of the spindle for urging the spindle toward the stand-by position.

12. The valve according to claim 11, and further comprising the secondary source, wherein the secondary source is an hydraulic accumulator.

13. The valve according to claim 12, wherein the shoulder is ring shaped.

14. The valve according to claim 10, and further comprising the secondary source, wherein the secondary source is an hydraulic accumulator.

15. The valve according to claim 9, and further comprising a spring in the liquid space and acting on the opposite end of the spindle for urging the spindle toward the stand-by position.

16. The valve according to claim 15, and further comprising the secondary source, wherein the secondary source is an hydraulic accumulator.

17. The valve according to claim 9, and further comprising the secondary source, wherein the secondary source is an hydraulic accumulator.

18. The valve according to claim 9, wherein the shoulder is ring shaped.

19. A valve and spray heads for a fire fighting installation, the valve comprising:

an inlet into a valve body for connection to a primary source of a first Liquid under a first pressure;

a liquid space in the valve body for connection to a secondary source of a second liquid under a second pressure;

an outlet from the valve body for connection to an out-going line for the first and second liquids;

a connection from the inlet to the outlet and a movable spindle in the valve body for closing the connection with one end of the spindle when the spindle is in a stand-by position and opening the connection when the spindle is in an activated position, an opposite end of the spindle being in the liquid space for the second pressure of the second liquid to urge the spindle toward the stand-by position, the spindle having a shoulder for pressing by the first pressure of the first liquid to urge the spindle toward the activated position, relative areas of the shoulder and the opposite end of the spindle being such that the first pressure can be higher than the second pressure for the second pressure still to urge the spindle sufficiently to hold the spindle in the stand-by position against the urging of the first pressure; and a channel through the spindle from the one end to the opposite end of the spindle for supplying the second liquid to the outlet even when the connection is closed, whereby, when fire-caused release of one of the spray heads on the out-going line drains sufficient of the second for the second pressure to fall, the first pressure urges the spindle sufficiently to move the spindle to the activated position for opening the connection and supplying the first liquid through the connection and the outlet to the out-going line; and the spray heads being on the out-going line, each of the spray heads comprising a housing, an inlet opening into the housing connected to the out-going line for receiving the first and second liquids therefrom, at least one nozzle connected to the inlet opening for spraying the liquids from the housing when the inlet opening is open, one spindle element in the housing having one end in the inlet opening for being acted on by the first and second pressures of the first and second liquids and being movable in the housing from a first position in which one end of the one spindle element closes the inlet opening to a second position in which the one end of the one spindle element opens the inlet opening, the pressures acting on the one end of the one spindle element to urge the spindle element toward the second position, and a spring in the housing and having one end acting on the one spindle element for urging the spindle element into the first position, whereby the urging of the spring can keep the inlet opening closed under the second pressure but open under the first pressure.

20. The valve and spray heads according to claim 19, and further comprising an ampoule in the housing for being crushed or melted by a fire, and another spindle element movably in the housing and having one end engaging the ampoule and an opposite end engaging an opposite end of the spring.

21. The valve and spray heads according to claim 20, and further comprising a stop in the housing for delimiting the second position of the one spindle element, wherein the ampoule has a strength such that it is not crushed by a force of the spring when the spindle element is in the second position.

\* \* \* \* \*